United States Patent [19]

Garasi et al.

[11] 4,086,318
[45] Apr. 25, 1978

[54] MOLDING PROCESS FOR A PLASTIC-COATED CERAMIC DECORATIVE PLUMBING FIXTURE

[75] Inventors: Louis A. Garasi, Canyon Country; Ronald F. Hayes, Northridge, both of Calif.

[73] Assignee: Gruber Systems, Inc., Valencia, Calif.

[21] Appl. No.: 788,547

[22] Filed: Apr. 18, 1977

[51] Int. Cl.² .................... B29C 5/00; B29C 25/00; B29G 7/00
[52] U.S. Cl. .......................... 264/135; 4/421; 264/73; 264/247; 264/255; 264/259; 264/265; 427/385 C; 428/446
[58] Field of Search ............... 264/259, 268, 247, 250, 264/255, 133, 134, 73, 135, 60, 77; 428/446, 431; 4/1, 10, 166, 12–14, 69; 427/385 C

[56] References Cited

U.S. PATENT DOCUMENTS

| | | | |
|---|---|---|---|
| 2,657,153 | 10/1953 | Russell | 427/385 C |
| 3,060,608 | 10/1962 | Stahmann | 264/247 |
| 3,172,775 | 3/1965 | Shaines | 427/385 C |
| 3,212,106 | 10/1965 | Noel | 264/250 |
| 3,575,916 | 4/1971 | Bockstie | 264/60 |
| 3,607,606 | 9/1971 | Beninga | 428/446 |
| 3,660,214 | 5/1972 | Nichols | 428/446 |
| 3,664,799 | 5/1972 | Wallick et al. | 425/389 |

*Primary Examiner*—Willard E. Hoag
*Attorney, Agent, or Firm*—W. Edward Johansen

[57] ABSTRACT

The invention is a molding process adapted for the production of plumbing fixtures, such as a toilet whose functional surfaces are resistant to erosion by moving water wherein a ceramic shell forms a liner having external surfaces and the functional surfaces of the plumbing fixture. In the case of the toilet the ceramic shell includes a bowl, a siphon trap and a water flush ring. The molding process includes the steps of coating the external surfaces of the ceramic shell with a layer of resilient material and then suspending the ceramic shell upside down within a female mold member having internal surfaces so that the internal surfaces of the female mold member are slightly spaced from the external surfaces of the ceramic shell thereby leaving a gap between the internal surfaces of the female mold member and the external surfaces of the ceramic shell. The molding process also includes the steps of filling the gap with a catalyzed polyester resin matrix mixed with a filler and pigments and permitting the matrix to bond and to cure to the coated external surfaces of the ceramic shell. The molding process further includes the step of removing the female mold member thereby producing a plumbing fixture, such as a toilet, that has an attractive exterior appearance which matches other plumbing fixtures to be used in the same room in both their color texture and their design.

2 Claims, 5 Drawing Figures

MOLDING PROCESS FOR A PLASTIC-COATED CERAMIC DECORATIVE PLUMBING FIXTURE

BACKGROUND OF THE INVENTION

1. Field of the Invention

The present invention relates to hybrid decorative plumbing fixtures and more particularly to a toilet which has a ceramic liner which is encased in a polyester casting.

2. Description of the Prior Art

In the past it has been common to construct wash basins and toilets out of a ceramic material, such as vitreous china. The surfaces of these plumbing fixtures are glazed in order to form very hard, shiny surfaces which for all practical purposes are impervious to stains and are not subject to erosion by moving water. The daily repeated use of a toilet over a period of several years causes a great deal of water to pass over its functional surfaces. However, the toilet shows no signs of wear due to the movement of water across its functional surfaces because the glazed ceramic material resists the effects of water movement.

All of these plumbing fixtures are designed to eliminate the effect of water erosion. They are not designed for their aesthetic part in a coordinated scheme of a decorated bathroom which has other plumbing fixtures including wash basins, bath-tubs and showers which utilize the plastic technology presently available. The decorator of a bathroom until recently was unable to use anything but a glazed ceramic toilet which was basically identical in appearance with other toilets.

Recently there has been a trend toward the redesigning of wash basins, bath-tubs and showers which are now formed out of plastic materials. These plastic materials have sufficient hardness to withstand water erosion over a period of several years. These wash basins, bath-tubs and showers are designed in different colors or may even be designed so that they have a simulated marble appearance. The plastic materials enable the decorators of apartments, houses and hotels to replace shiny ceramic plumbing fixtures with decorative plastic plumbing fixtures which can be baried not only in shape and design, but also in color and texture.

In hotels the most popular plumbing fixtures have been those which are ornate and which also have a simulated marble appearance. U.S. Pat. No. 3,150,032, entitled Abuse Resistant Articles of Manufacture and Method of Making, issued to David Rubenstein on Sept. 22, 1964, teaches a filled transparent synthetic plastic composition which is used in a plastic structure in which an opaque material is visibly embedded in a filled matrix. The synthetic plastic composition is molded into the shape of a shower, a wash basin or a bath-tub.

U.S. Pat. No. 3,906,072, entitled Molding Process, issued to Thomas W. Haas, Richard L. Mach, Edward Studley and Robert Hoffman on Sept. 16, 1975, teaches a method of molding sanitary ware from a thermosetting resin such as melamine. The mold is configured to a minimum draft angle for the most steeply sloped wall. The resin is charged into the mold in the form of one or more thickened cakes of agglomerated resin particles. The mold configuration and method of charging are such that the steeply sloped mold surfaces achieve a relatively high pressure on the plastic so as to minimize surface porosity. During the closing movement of the mold the cake of resin is broken and caused to flow upwardly to form an integral deck portion as well as flow downwardly against the steeply sloped surface of the receiving mold. According to the inventors of this molding process, the molding process may be used to mold wash basins, bath-tubs, showers, toilet bowls and toilet tanks.

The present inventors disagree that the above described molding process could be used for toilet bowls because the plastic surfaces of the toilet bowls which are exposed to water movement become eroded and also become stained. The inventors further point out that whereas a shower, a wash basin or a bath-tub is filled with water only it is in use, a toilet bowl is always filled with water with the single exception when it is being flushed. The inventors have found that the plastic materials do not hold up against erosion by the presence of water and by the water movement within a toilet bowl.

The present inventors recognized a need for a toilet bowl whose functional surfaces were formed out of a glazed ceramic material and whose external surfaces were coated with a synthetic plastic composition such as simulated marble. They first tried using a ceramic shell liner having external surfaces and internal surfaces which were also function and also having a bowl, a siphon trap and a water flush ring. They roughened the external surfaces of the ceramic shell liner by either sandblasting or chemically etching these surfaces. They left the internal surfaces glazed in order to withstand erosion by water movement. They next placed a synthetic plastic composition about the external surfaces of the ceramic shell liner and allowed the composition to cure and to bond to external surfaces thereby forming a toilet bowl which would match the other plumbing fixtures in a bathroom. The inventors encountered a serious problem in using this molding process because the synthetic plastic composition as it cured itself shrank and cracked the ceramic shell liner.

SUMMARY OF THE INVENTION

In view of the factors and conditions characteristic of the prior art it is a primary object of the present invention to provide a molding process which will produce a toilet fixture which has glazed ceramic functional surfaces and attractively colored plastic external surfaces.

It is another object of the present invention to provide a toilet fixture that not only matches the design and color texture of the other plumbing fixtures in a bathroom, but that also resists erosion by water movement and is impervious to stains.

It is still another object of the present invention to provide a molding process that compensates for the shrinkage of the synthetic plastic composition about a ceramic shell liner.

It is yet another object of the present invention to provide a molding process that produces an asthetically attractive toilet fixture that has its external surfaces covered with simulated marble and that has a design and a color texture that can duplicated for any number of toilet fixtures.

In accordance with an embodiment of the present invention a molding process adapted for the production of a plumbing fixture, such as a toilet, whose functional surfaces are resistant to erosion by moving water wherein a ceramic shell forms a liner having external surfaces and the functional surfaces of the plumbing fixture is described. In the case of a toilet the ceramic shell includes a bowl, a siphon trap and a water flush ring. The molding process includes the steps of coating the external surfaces of the ceramic shell with a layer of resilient material and then suspending the ceramic shell upside down within a female mold member having internal surfaces such that the internal surfaces of the female mold member are slightly spaced from the external surfaces of the ceramic shell thereby leaving a gap between the internal surfaces of the female mold member and the external surfaces of the ceramic shell. The molding process also includes the steps of filling the gap with a catalyzed polyester resin matrix mixed with a filler and pigments and permitting the matrix to cure and to bond to the coated external surfaces of the ceramic shell. The molding process further includes the step of removing the female mold member thereby producing a plumbing fixture, such as a toilet, that has an attractive exterior appearance which matches other plumbing fixtures to be used in the same room in both their color texture and their design.

The features of the present invention which are believed to be novel are set forth with particularity in the appended claims.

Other objects and many of the attendant advantages of this invention will be more readily appreciated as the same becomes better understood by reference to the following detailed description and considered in connection with the accompanying drawing in which like reference symbols designate like parts throughout the figures.

DESCRIPTION OF THE PREFERRED EMBODIMENT

Figure 1:
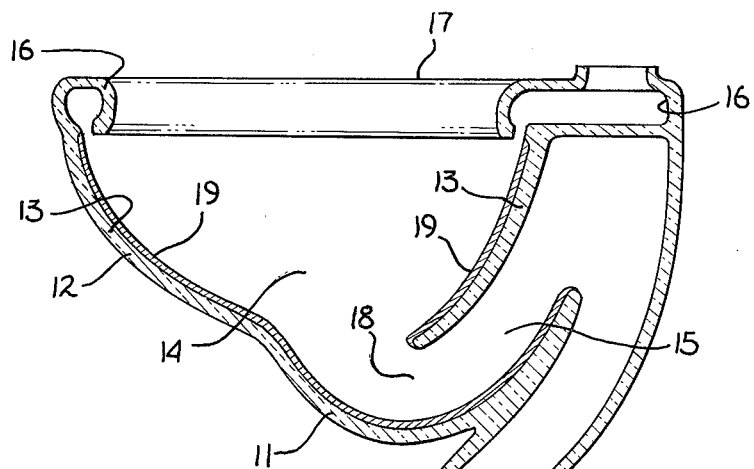
FIG. 1 is a side cross-sectional view of a ceramic toilet shell that has external surfaces and functional surfaces which are glazed and fired.

The present invention can best be understood by reference to a description of its preferred embodiment in conjunction with the figures of the drawing. The preferred embodiment of the present invention is a toilet fixture which has its external surfaces coated with simulated onyx.

Referring to FIG. 1 a side cross-sectional view of a ceramic shell liner 11 of a toilet fixture is shown. The ceramic shell liner 11 has unfinished external surfaces 12 and functional surfaces 13. The ceramic shell liner 11 includes a bowl 14, a siphon trap 15 and a water ring 16. The bowl 14 has an opening 17 around which the water flush ring 18 is disposed. The bottom portion of the bowl 14 has an opening 16 which connects with the siphon trap 15. The visable portions of the functional surfaces of the bowl 14, the siphon trap 15 and the water flush ring 16 are glazed and fired in kiln thereby producing a hard shiny layer 19. The formation of this layer 19 is accomplished by conventional methods. In a conventional process for manufacturing a ceramic toilet, the external surfaces would also be glazed and fired. The external surfaces 12 of the ceramic liner 11 are unglazed. Generally the ceramic shell liner is of even thickness throughout and is approximately three-eights of an inch.

Figure 2:
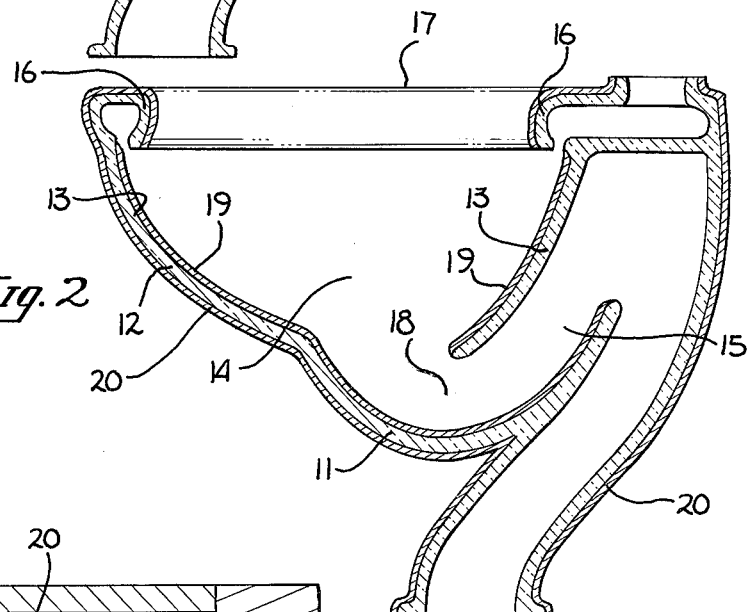
FIG. 2 is a side cross-sectional view of the ceramic toilet shell of FIG. 1 which has its external surfaces coated with a layer of resilient material in accordance with the principles of the present invention.

Referring now to FIG. 2 the exteral surface 12 of ceramic shell liner 11 is coated with a layer 20 of resilient material which bonds thereto.

Figure 3:
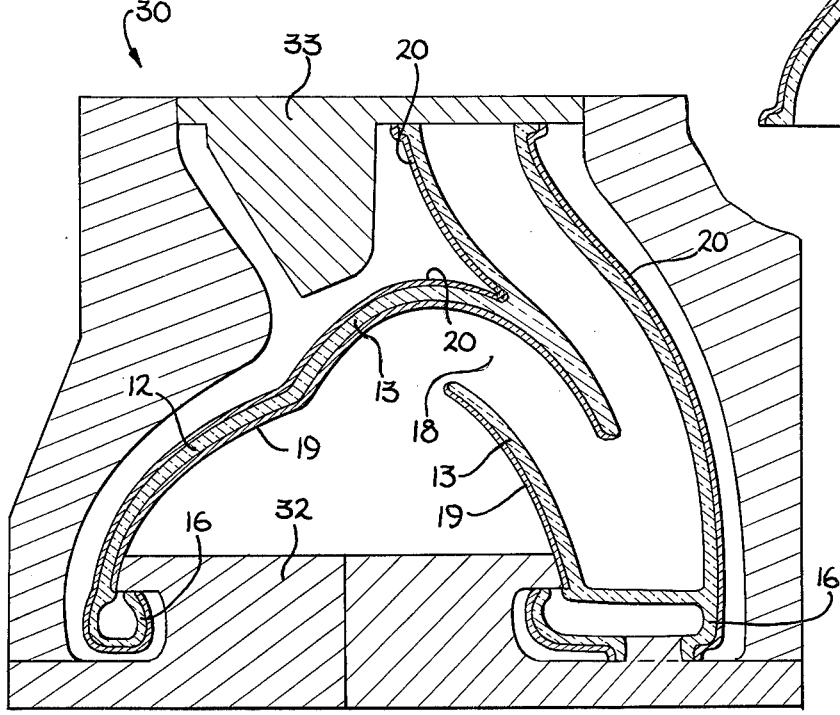
FIG. 3 is a cross-sectional view of the ceramic toilet shell of FIG. 1 disposed upside down and suspended within a female mold member which is also shown in a cross-sectional view.

Referring now to FIG. 3 the ceramic shell is placed in an upside down manner within a mold cavity formed by the female mold assembly 30. The female mold assembly 30 includes a first side mold member 31 a second side mold member 32 and a bottom mold member 33. The ceramic shell 11 is placed within the female mold cavity so that there is an even gap located all about the external surfaces 12 of the ceramic shell liner 11. It is to be noted that the gap 34 extends about the water flush ring 16 with a protuberance of the female mold assembly 30 being located within a water inlet opening which supplies water from a tank (not shown) into the bowl of the toilet fixture to seal off during casting the water ring 12. The positioning of the ceramic shell within the mold cavity to produce an even gap 34 is facilitated due to the placement of the protuberance within the opening which is essentially a self aligning feature. Within the gap 34 is to be poured the plastic matrix. This plastic matrix will entirely fill the gap 34. This plastic material upon curing will be bonded directly to layer 20 of resilient material 24 of the ceramic shell liner 11. There will be a slight amount of shrinkage, usually 2 to 3 percent, during the curing of the plastic material. This shrinkage is absorbed by the layer 20 of resilient material and serves to insure a strong mechanical bond to the ceramic shell liner 11. With the addition of the layer 20 the shrinkage is not sufficient to cause any undue strain or stress upon the ceramic shell liner 11 which will break it.

Generally it is desirable to obtain a smooth, glossy external layer of plastic that is also hard. This layer is obtained by coating the interior cavity of the female mold assembly 30 with a gel coat. The use of the gel coat is very common in the plastic industry where there are several different types of gel coat materials. For use in the present invention a gel coat in the form of a thin liquid plastic material which can be easily sprayed upon the interior surfaces of the cavity has been found acceptable by the inventors.

The molding process includes the step of pouring a matrix 35 of a particular color into the gap 34. The matrix may be colored to include striations such that it resembles marble texture. The matrix 35 generally includes a polyester resin that has been catalyzed by a methyl-ethyl ketone peroxide or a methyl methacrylate monomer catalyzed appropriately. The matrix 35 further includes fillers such as $CaCO_3$ and hydrated alumina in addition to other organic and inorganic materials. The catalysts and fillers are mixed together and the resulting mixture has pigments added thereto in order to form the matrix 35 which is poured into the gap 34.

Figure 4:
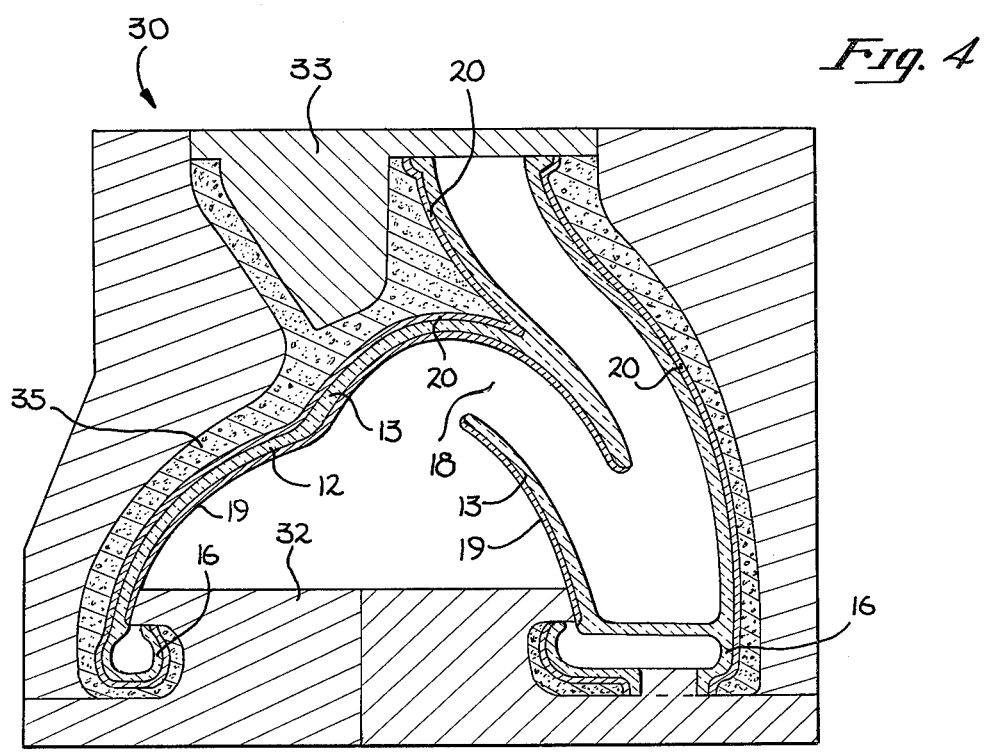
FIG. 4 is a cross-sectional view of the ceramic toilet shell of FIG. 1 which is suspended upside down in the female mold member of FIG. 3 after a synthetic polyester resin composition has been injected between the internal surfaces of the female mold member and the external surfaces of the external surfaces of the ceramic toilet shell.

The inventors have noted that the greater the amount of fillers added to the polyester resin, the less likely the composition will pour. Since it is desirable that the matrix 35 be pourable, the preferrable range of filler to overal composition is from the 30 to 60 per cent by weight. Reference to FIG. 4 shows the female mold assembly 30 after the matrix 35 has been poured into the gap 34.

Figure 5:
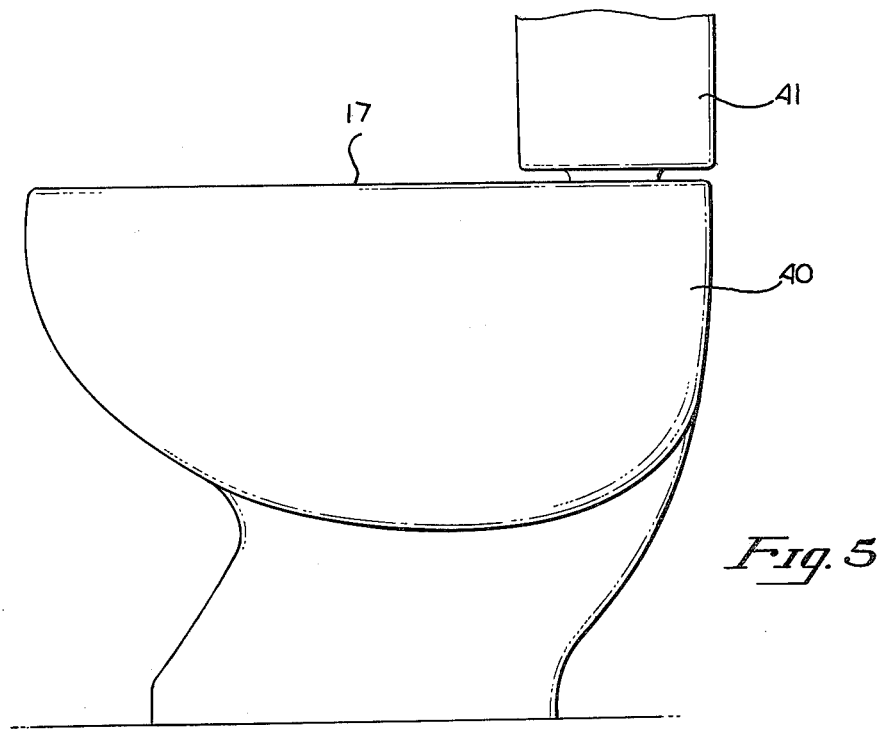
FIG. 5 is a side elevational view of a simulated marble or plastic plumbing fixture which is constructed in accordance with the principles of the present invention.

When the matrix hardens sufficiently, the mold members 31, 32 and 33 are removed and the resulting finished product is shown in FIG. 5. The toilet fixture has a smooth, glossy external surface 40 and is mechanically coupled to a water tank 41. The toilet fixture has all of the features of a conventional toilet fixture plus the addition of an ornamental and attractive external surface 40. The construction of the water tank 41 may be totally done by a method of molding or casting a composition that is similar to the external surface 40 of the toilet fixture.

The inventors have also discovered that if they use a composition of polyester resins that is relatively low-shrinking they can eliminate the layer 20 of resilient material. Presently these resins are more expensive than the resins in commercial use.

The inventors believe that their basic invention is a ceramic shell liner 11 which is used as the male mold member in conjunction with a female mold assembly to produce an ornamental plumbing fixture. The use of the ceramic shell liner 11 is unique in and of itself. The inventors have discovered two alternate methods of eliminating the breaking that occurs when the resins cure. The first method is to add a layer of resilient material to the external surfaces of the ceramic shell liner in order to absorb the shrinkage of the resins. The second method is use a low-shrinking resin.

From the foregoing it can be seen that a toilet fixture with an attractive and ornamental external surface has been described. Furthermore the functional surfaces of this toilet fixture are formed from a ceramic material with those functional surfaces that are visable being glazed and fired to provide a hard and shiny surface that is impervious to stains and water erosion.

It should be noted that the schematics of the molding process are not drawn to scale and that distances of and between the figures are not to be considered significant.

Accordingly, it is intended that the foregoing disclosure and showing made in the drawing shall be considered only as an illustration of the principle of the present invention.

What is claimed is:

1. A molding process adapted for the production of a plumbing fixture whose functional surfaces are resistant to erosion caused by moving water wherein a ceramic shell forms a liner having external surfaces and the functional surfaces of said plumbing fixture, said molding process comprising the steps of:
   a. coating the external surfaces of said ceramic shell with a layer of resilient material;
   b. suspending said ceramic shell upside down within a female mold member having internal surfaces so that the internal surfaces of said female mold member are slightly spaced from the external surfaces of said ceramic shell thereby leaving a gap between the internal surfaces of said female mold member and the external surfaces of said ceramic shell;
   c. filling said gap with a catalyzed polyester resin matrix mixed with a filler and pigments;
   d. permitting said matrix to bond and to cure to the coated external surfaces of said ceramic shell; and
   e. removing said female mold member thereby producing a plumbing fixture having an attractive exterior appearance which matches the color texture and the design of other plumbing fixtures to be used in the same room.

2. A molding process according to claim 1 wherein said plumbing fixture is a toilet and said ceramic shell includes a bowl, a siphon trap and a water flush ring.

* * * * *